Jan. 14, 1930.　　　A. JOHNSON　　　1,743,894
ELEVATOR GUIDE RAIL LUBRICATING DEVICE
Filed March 31, 1927　　2 Sheets-Sheet 1

WITNESSES
H. T. Walker
Hugh H. Off

INVENTOR
Albert Johnson
BY
ATTORNEY

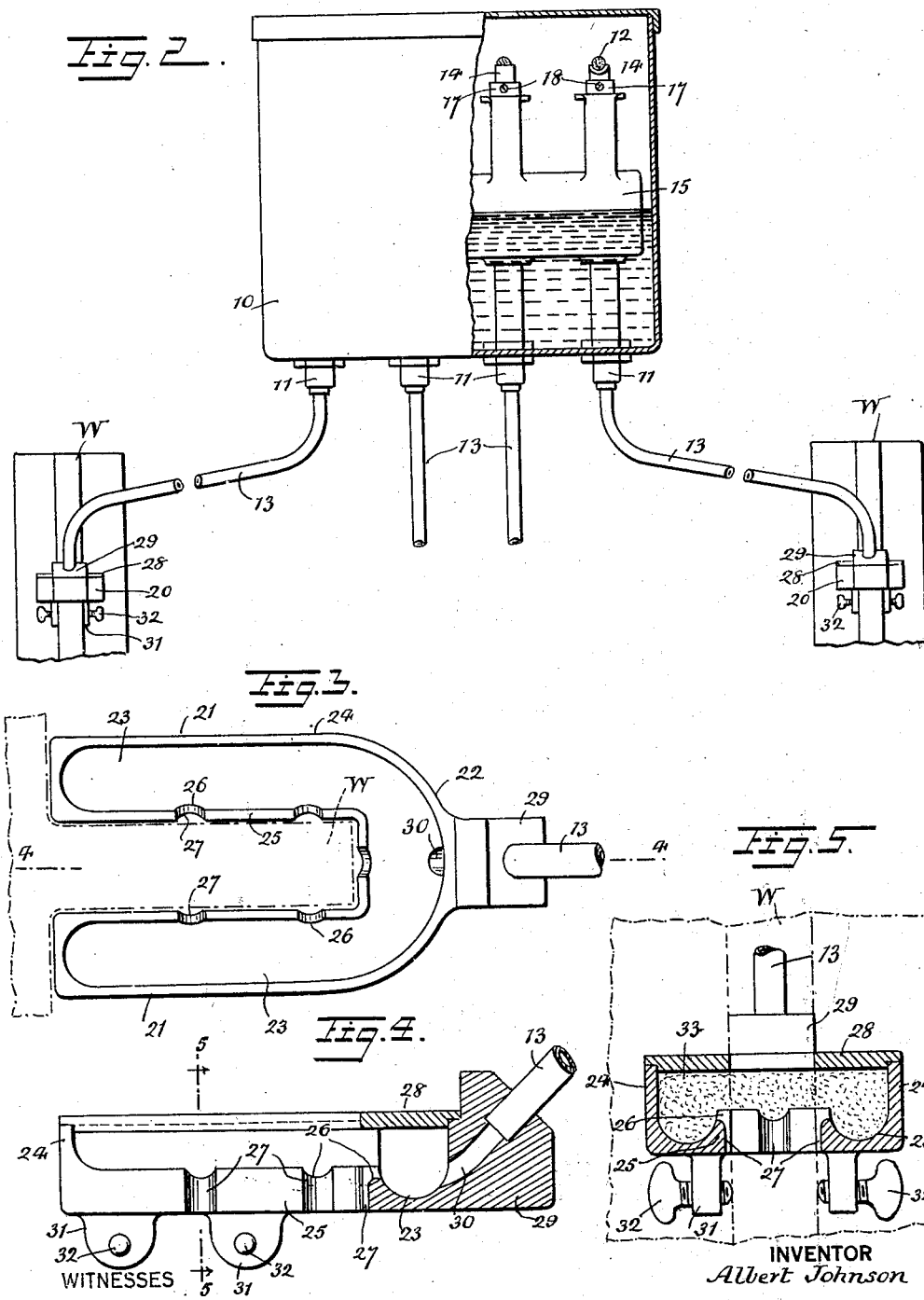

Patented Jan. 14, 1930

1,743,894

UNITED STATES PATENT OFFICE

ALBERT JOHNSON, OF NEW YORK, N. Y.

ELEVATOR-GUIDE-RAIL-LUBRICATING DEVICE

Application filed March 31, 1927. Serial No. 180,007.

This invention relates to lubricators and refers to a lubricator which is particularly designed for automatically supplying lubricant to elevator and counterweight guide rails.
One of the principal objects of the present invention is to provide a lubricator of the capillary feed type including means which functions to feed a uniform supply of lubricant irrespective of the level of lubricant in the reservoir. This obviously overcomes the tendency of the feed to vary in devices which have hitherto operated on the capillary feed principle.

As a further object the invention comprehends a means for varying the quantity of lubricant fed, whereby the feed may be increased or decreased as desired.

As a further object the invention comprehends an improved guide-rail lubricant-receiving and applying element for uniformly distributing the lubricant to the active surfaces of the guide rail.

Other objects reside in the comparative simplicity of construction, the economy with which the lubricating device may be produced and installed and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Fig. 2 is a front view with the reservoir broken away and shown in section;

Fig. 3 is a plan view of the guide-rail lubricant-receiving and applying element, with the cover plate removed;

Fig. 4 is a sectional view therethrough taken approximately on the line 4—4 of Fig. 3;

Fig. 5 is a transverse sectional view taken approximately on the line 5—5 of Fig. 4.

Figure 1:
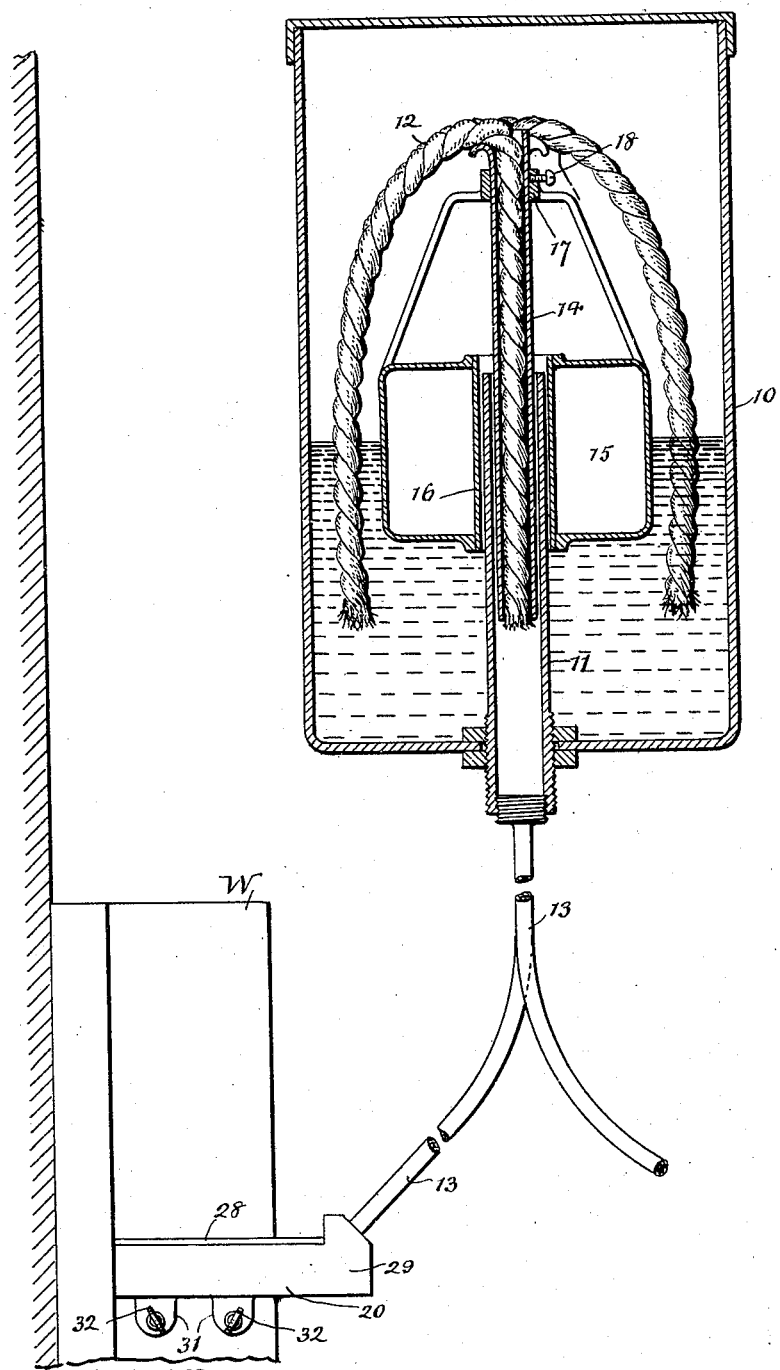
Figure 1 is a vertical transverse sectional view through a device constructed in accordance with the invention.

Referring to the drawings by characters of reference, 10 designates a lubricant reservoir which is preferably installed in the motor room above the elevator shaft. One or more conduits 11 extend into the reservoir and have their upper ends above the maximum level of the lubricant, with the opposite end extending below the bottom of the reservoir. A capillary lubricant feed element 12, such as a wick, has one end extending into the conduit 11 and the opposite end immersed in the lubricant, whereby by capillary action the lubricant is conveyed from the supply in the reservoir, into the conduit 11. The lower end of the conduit has attached thereto and communicating therewith, a lubricant conveyor tube 13 which leads to the point where the lubricant is to be fed.

In order to provide means for maintaining the exposed end of the feed element or wick 12 at a predetermined distance below the surface level of the lubricant in the reservoir, to effect a constant uniform feed irrespective of the level of the lubricant in the reservoir, a wick tube 14 is connected to and supported by a float 15, which rises and falls with the lubricant. The wick tube 14 extends downwardly into the conduit 11 and preferably the float 15 is provided with a central aperture 16 for receiving the conduit 11, which serves as a guide for the float. The wick tube 14 may be adjustably connected with the float 15 so as to vary the distance of the exposed end of the wick below the surface level of the lubricant in the reservoir whereby to regulate the amount of lubricant fed. This adjustable connection is accomplished by positioning the wick tube in a collar 17 carried by the float and employing a set screw 18 threaded through the collar and impinged against the wick tube 14. When it is desired to increase the feed of lubricant it is obvious that the wick tube will be lowered in the collar, to dispose the exposed end of the wick at a greater distance below the surface level of the lubricant in the reservoir and, conversely to decrease the feed the wick tube will be raised in the collar to dispose the exposed end nearer to but below the surface level of the lubricant in the reservoir.

In order to provide a lubricant-receiving and applying element which will uniformly distribute the lubricant to an elevator guide rail, a receptacle 20 is employed of substantially U-shaped configuration in plan view, the parallel legs or arms 21 of which will be disposed alongside of the side faces of the web W of the guide rail, and the bight 22 of which will be disposed alongside of the outer end of said web. The receptacle is formed with a channel 23 in its upper face defined by outer marginal flanges 24 and inner marginal flanges 25, the latter being of considerably less height than the former and having horizontal grooves 26 in its upper face and vertical grooves 27 in its inner side face. A cover plate 28 of similar configuration is adapted to overlie the receptacle 20 and rest upon the upper ends of the outer marginal flanges 24. The bight portion 22 is provided with a boss 29 through which an intake port 30 extends at an angle, said port receiving at its outer end, the conveyor tube 13 leading from the source of lubricant supply. The legs or arms 21 of the receptacle are provided with depending threaded ears 31 through which set screws 32 are threaded for impinging engagement with the opposite side faces of the guide rail web W to support the receptacle 20 in place thereon. The receptacle 20 will be filled with an absorbent material 33 for receiving and distributing the lubricant to the surface of the guide rail web W.

In use and operation, it is obvious that lubricant conveyed by capillary action through the wick 12 from the end immersed in the lubricant supply in the reservoir 10, will be conveyed into the conduit 11 and thence will gravitate through the conveyor tubes 13 to the lubricant-receiving and applying elements 20. It is, of course, obvious that due to the manner in which the wick 12 is supported with respect to the supply of lubricant in the reservoir, the exposed end of the wick will always be maintained at the same relative distance below the surface level of the lubricant supply irrespective of changes in the lubricant level, so that the feed of lubricant will be constant and uniform. It is also obvious that the feed may be varied by raising or lowering the tube with respect to the supporting float 15, through the collar and screw connection 17 and 18.

What is claimed is:

1. In a lubricator, a reservoir for liquid lubricant, a conduit pipe extending through the bottom of the reservoir and having the upper end disposed above the lubricant level, a float in the lubricant, a wick tube attached to the float and extending downwardly into the conduit pipe, and a wick having one end immersed in the lubricant and the opposite exposed end arranged in the wick tube and disposed at a predetermined distance below the surface level of the lubricant in the reservoir whereby to effect the feeding of a uniform supply of lubricant into the conduit pipe by capillary siphonic action.

2. In a lubricator, a reservoir for liquid lubricant, a conduit pipe extending through the bottom of the reservoir and having the upper end disposed above and lubricant level, a float in the lubricant, a wick tube attached to the float and extending downwardly into the conduit pipe, and a wick having one end immersed in the lubricant and the opposite exposed end arranged in the wick tube and disposed at a predetermined distance below the surface level of the lubricant in the reservoir whereby to effect the feeding of a uniform supply of lubricant into the conduit pipe by capillary siphonic action, the wick tube having an adjustable connection with the float for varying the quantity of lubricant being fed.

3. In a lubricator, a reservoir, a conduit leading therefrom to the element to be lubricated and having the upper end disposed above the level of lubricant in the reservoir, a wick, and means for supporting the wick with respect to the lubricant level so as to maintain a predetermined length thereof out of the lubricant to effect a uniform feeding of the lubricant from the reservoir into the conduit.

4. In a lubricator, a reservoir, a conduit leading therefrom to the element to be lubricated and having the upper end disposed above the level of lubricant in the reservoir, and means for effecting a uniform feeding of the lubricant from the reservoir into the conduit by capillary siphonic action, said means comprising a wick having one end immersed in the lubricant and a float for buoyantly supporting the same by the lubricant whereby the opposite exposed end of said wick is maintained at a predetermined distance below the surface level of said lubricant.

5. In a lubricator, a reservoir, a wick having one end immersed in the lubricant and means for maintaining the exposed end of the wick at a predetermined distance below the surface level of the lubricant to obtain a uniform feed of the lubricant through the wick irrespective of changes in the lubricant level in the reservoir.

6. In a lubricator, a reservoir, a wick having one end immersed in the lubricant and means for maintaining the exposed end of the wick at a predetermined distance below the surface level of the lubricant to obtain a uniform feed of the lubricant through the wick irrespective of changes in the lubricant level in the reservoir, said means being adjustable to vary the distance of the exposed end of the wick below the surface level of the lubricant for controlling the feed of the lubricant.

7. In a lubricator, a reservoir for a liquid lubricant, a conduit extending into the reservoir and having its upper end above the maximum level of the lubricant, a capillary lubricant feed element having one end extending into the conduit and having the opposite end immersed in the lubricant, and means for maintaining a predetermined portion of the exposed end of the wick below the lubricant level to effect a constant uniform feed of the lubricant irrespective of the level in the reservoir.

ALBERT JOHNSON.